United States Patent
Srivastava et al.

(10) Patent No.: US 7,152,185 B2
(45) Date of Patent: Dec. 19, 2006

(54) METHOD FOR EVENT TRIGGERED MONITORING OF MANAGED SERVER HEALTH

(75) Inventors: Rahul Srivastava, Randolph, NJ (US); Ananthan Bala Srinivasan, San Francisco, CA (US); Eric M. Halpern, San Francisco, CA (US); Dean Bernard Jacobs, Berkeley, CA (US)

(73) Assignee: BEA Systems, Inc., San Jose, CA (US)

( * ) Notice: Subject to any disclaimer, the term of this patent is extended or adjusted under 35 U.S.C. 154(b) by 150 days.

(21) Appl. No.: 10/338,981

(22) Filed: Jan. 9, 2003

(65) Prior Publication Data

US 2003/0236880 A1    Dec. 25, 2003

Related U.S. Application Data

(60) Provisional application No. 60/359,009, filed on Feb. 22, 2002.

(51) Int. Cl.
    *G06F 17/30*   (2006.01)
(52) U.S. Cl. .......................... 714/24; 714/25
(58) Field of Classification Search ............. 707/10, 707/3, 4, 5, 6, 103 R, 104.1; 705/1; 709/201, 709/222, 223, 224; 713/200, 201; 714/11, 714/25, 38, 47, 24
    See application file for complete search history.

(56) References Cited

U.S. PATENT DOCUMENTS

| | | | |
|---|---|---|---|
| 5,432,715 A | 7/1995 | Shigematsu et al. | 702/188 |
| 5,500,940 A | 3/1996 | Skeie | 704/25 |
| 5,638,514 A | 6/1997 | Yoshida et al. | 709/224 |
| 5,819,028 A | 10/1998 | Manghirmalani et al. | 714/57 |
| 6,085,243 A | 7/2000 | Fletcher et al. | 709/224 |
| 6,170,067 B1 | 1/2001 | Liu et al. | 714/48 |
| 6,182,157 B1 | 1/2001 | Schlener et al. | 719/318 |
| 6,349,335 B1 | 2/2002 | Jenney | 709/224 |
| 6,553,515 B1 | 4/2003 | Gross et al. | 714/47 |
| 6,631,409 B1 | 10/2003 | Watson et al. | 709/224 |
| 6,681,342 B1 | 1/2004 | Johnson et al. | 714/30 |
| 6,738,811 B1 | 5/2004 | Liang | 709/224 |
| 6,785,840 B1* | 8/2004 | Smith et al. | 714/11 |
| 2002/0016911 A1 | 2/2002 | Chawla et al. | 713/153 |
| 2003/0037289 A1* | 2/2003 | Singh et al. | 714/38 |
| 2003/0061340 A1 | 3/2003 | Sun et al. | 709/224 |
| 2003/0069953 A1* | 4/2003 | Bottom et al. | 709/223 |

OTHER PUBLICATIONS

M.H. Guiagoussou, A Java API for Advanced Faults Management, 2001, IEEE.
Java Management Extensions (JMX) 1999, Sun Microsystems.

* cited by examiner

*Primary Examiner*—Apu M. Mofiz
(74) *Attorney, Agent, or Firm*—Fliesler Meyer LLP

(57) ABSTRACT

A Node Manager monitors the status of multiple servers. The Node Manager detects server failures, periodically monitors server health status, and performs server maintenance. When the Node Manager detects a server failure, it determines whether or not the server should be restarted. While periodically monitoring servers, the Node Manager may determine how often to trigger a health check, how long to wait for a response, and how to proceed if the server is deemed failed. The Node Manager may be controlled by an Administrative Server directly or by an external administrative agent. An administrative agent may control the Node Manager by interfacing with the Administrative Server. The Node Manager and AS may authenticate each other and encode their communications to each other for increased security.

21 Claims, 5 Drawing Sheets

METHOD FOR EVENT TRIGGERED MONITORING OF MANAGED SERVER HEALTH

CLAIM TO PRIORITY

The present application claims the benefit of priority under 35 U.S.C. § 119(e) to U.S. Provisional Patent Application entitled "ECS NODE MANAGER FOR ENSURING HIGH AVAILABILITY SERVER AND APPLICATION", Patent Application No. 60/359,009, filed on Feb. 22, 2002, which application is incorporated herein by reference.

CROSS REFERENCE TO RELATED APPLICATIONS

The present application is related to the following United States patents and patent applications, which patents/applications are assigned to the owner of the present invention, and which patents/applications are incorporated by reference herein in their entirety:

U.S. patent application Ser. No. 10/339,469, entitled "METHOD FOR AUTOMATIC MONITORING OF MANAGED SERVER HEALTH", filed on Jan. 09, 2003, currently pending, which claims priority to provisional United States Patent Application entitled "ECS NODE MANAGER FOR ENSURING HIGH AVAILABILITY SERVER AND APPLICATION", Patent Application No. 60/359,009, filed on Feb. 22, 2002;

U.S. patent application Ser. No. 10/339,144, entitled "SYSTEM FOR MONITORING MANAGED SERVER HEALTH", filed on Jan. 09, 2003 currently pending, which claims priority to provisional U.S. Patent Application entitled "ECS NODE MANAGER FOR ENSURING HIGH AVAILABILITY SERVER AND APPLICATION", Patent Application No. 60/359,009, filed on Feb. 22, 2002;

U.S. patent application Ser. No. 10/340,496, entitled "METHOD FOR INITIATING A SUB-SYSTEM HEALTH CHECK", filed on Jan. 10, 2003 currently pending, which claims priority to provisional U.S. Patent Application entitled "Server Self-Health Monitor", Patent Application No. 60/359,010, filed on Feb. 22, 2002;

U.S. patent application Ser. No. 10/340,227, entitled "METHOD FOR MONITORING A SUB-SYSTEM HEALTH", filed on Jan. 10, 2003, currently pending, which claims priority to provisional U.S. Patent Application entitled "Server Self-Health Monitor", Patent Application No. 60/359,010, filed on Feb. 22, 2002; and U.S. patent application Ser. No. 10/340,002, entitled "SYSTEM FOR MONITORING A SUBSYSTEM HEALTH", filed on Jan. 10, 2003, currently pending, which claims priority to provisional U.S. Patent Application entitled "Server Self-Health Monitor", Patent Application No. 60/359,010, filed on Feb. 22, 2002.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention relates generally to managing a network of servers, and more particularly to monitoring the health of a network of servers.

BACKGROUND OF THE INVENTION

As computer and computer systems have evolved over the years, the processes they implement have evolved in their complexity. One approach to implementing computer processes to solve more complex problems is to assign a number of computers to handle different parts of a process. Each part or task may be handled by different computers, computer objects, applications, or servers, hereafter referred to collectively as servers. These servers make up a distributed network. Within the network, different servers may handle functions such as management, data base maintenance, accessibility, server boot-up, shut-down, and so forth.

Servers within a distributed network perform transactions with other servers and use resources within the system. As the servers require the use of other servers and resources, the operability and reliability of the servers become more important. If a server fails while performing a task, it may affect other servers and resources that were tied up in transactions with the server at the time of its failure. Whether a server has failed completely or the server's condition has degraded is important information to a network. Thus, it is important to know the status of a server in order to maintain the health of the server and the network in which it operates. A maintenance system should be able to require a server to provide health information and be able to maintain or correct servers not operating properly.

What is needed is a system for monitoring and inquiring into the health of a server and for taking corrective action if deemed appropriate.

SUMMARY OF THE INVENTION

In one embodiment of the present invention, a Node Manager (NM) monitors the status of multiple servers. The NM detects server failures, periodically monitors server health status, and performs server maintenance. When the NM detects a server failure, it determines whether or not the server is restartable. If the server is restartable, the NM checks to see if any other conditions exist that limit the server from being restarted. If no other conditions exist, the server is restarted. If the failed server is not restartable or other conditions exist preventing the server from being restarted, the failed server is not restarted.

In another embodiment of the present invention, the NM periodically monitors the health of a server whether or not the NM detects a server failure. This process begins when the NM makes a health query to a server. Then, the NM waits for a server response containing the server's health information. If the server replies that it is healthy, the NM continues to monitor the server. If the server's reply indicates the server's health is degenerate or the server does not reply at all, the NM presumes the server has failed. The NM may wait a specified period of time before deciding the server has failed to respond to a query. Once a server is deemed failed, the NM then determines whether to terminate the server.

The NM may be controlled by parameters located within the NM or Administration Server (AS). The parameters may be burned into system software or modified at runtime. In another embodiment, the NM may be controlled by an external administrative agent. An administrative agent may control the NM by interfacing with the AS. For increased security, the NM and AS may authenticate each other and encode their communications between each other.

DETAILED DESCRIPTION

A self health monitoring system may be composed of several nodes. A node may be a single physical machine or take some other form. In one embodiment of the present invention, each node has a Node Manager (NM), an Administration Server (AS), and several other managed servers or server instances. The AS and NM may send and transmit messages to each other. The NM may also send and transmit messages with the other servers located on the node.

In one embodiment, the NM performs two primary functions. First, the NM automatically detects and restarts failed servers. The NM continually monitors servers running on the local machine. Upon detecting a server has failed, the NM will automatically restart the failed server. The server restart may occur as soon as the NM detects the server failure. Secondly, the NM periodically monitors and restarts failed or degenerate servers. The NM will periodically monitor servers running on the local machine. When the NM detects that a server is less than healthy, the NM may restart the server depending on server parameters and the condition of the server. In one embodiment, runtime java MBeans hosted on the AS are used in conjunction with the NM to achieve these functions. The runtime java MBeans offer the functionality of the NM and the health information acquired by the NM to clients in a programmatic manner.

Figure 1:
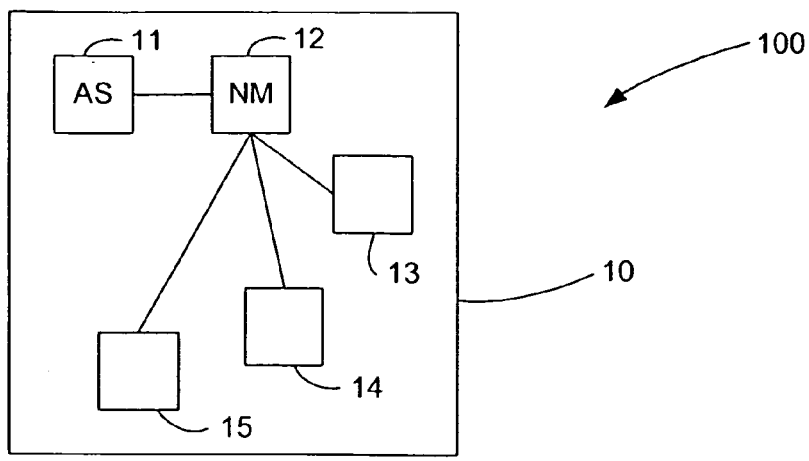
FIG. 1 is a block diagram of several nodes having servers in a self health monitoring system in accordance with one embodiment of the present invention.
Figure 1:
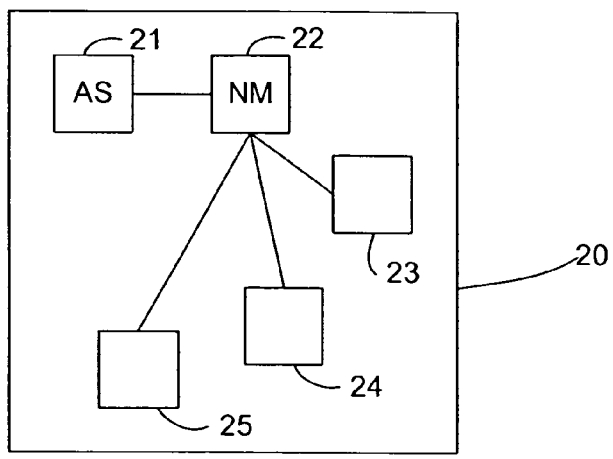
Figure 1:
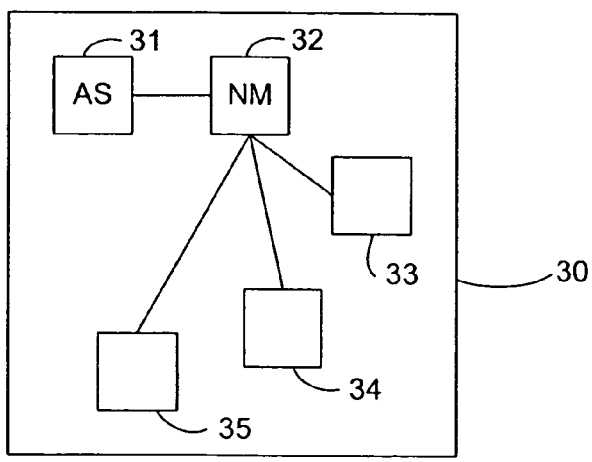

FIG. 1 depicts a self health monitoring system 100 in accordance with one embodiment of the present invention. As shown, system 100 includes a first node 10, a second 20, and a third node 30. Each node may contain an AS 11, 21, and 31, and an NM 12, 22, and 32, respectively. In each node, the AS communicates with the NM. In one embodiment of the present invention, the AS and the NM communicate through a (SSL) secure socket layer connection. Each node also contains at least one managed server. In one embodiment, these managed servers may be composed of server instance processors or logic servers all located on one hardware machine. Hereinafter, the term "server" shall be understood to include server instance processors, server instance logic, and other managed servers. A node may be one physical machine with servers that communicate with other servers on the same machine. As shown in FIG. 1, node 10 includes servers 13–15, node 20 includes servers 23–25, and node 30 includes servers 33–35. An NM may communicate with the servers within the particular NM's node. For example, NM 12 can communicate with servers 13, 14, 15, all within node 10. In one embodiment, the NM communicates with the servers within its node through a secure socket layer connection.

Figure 2:
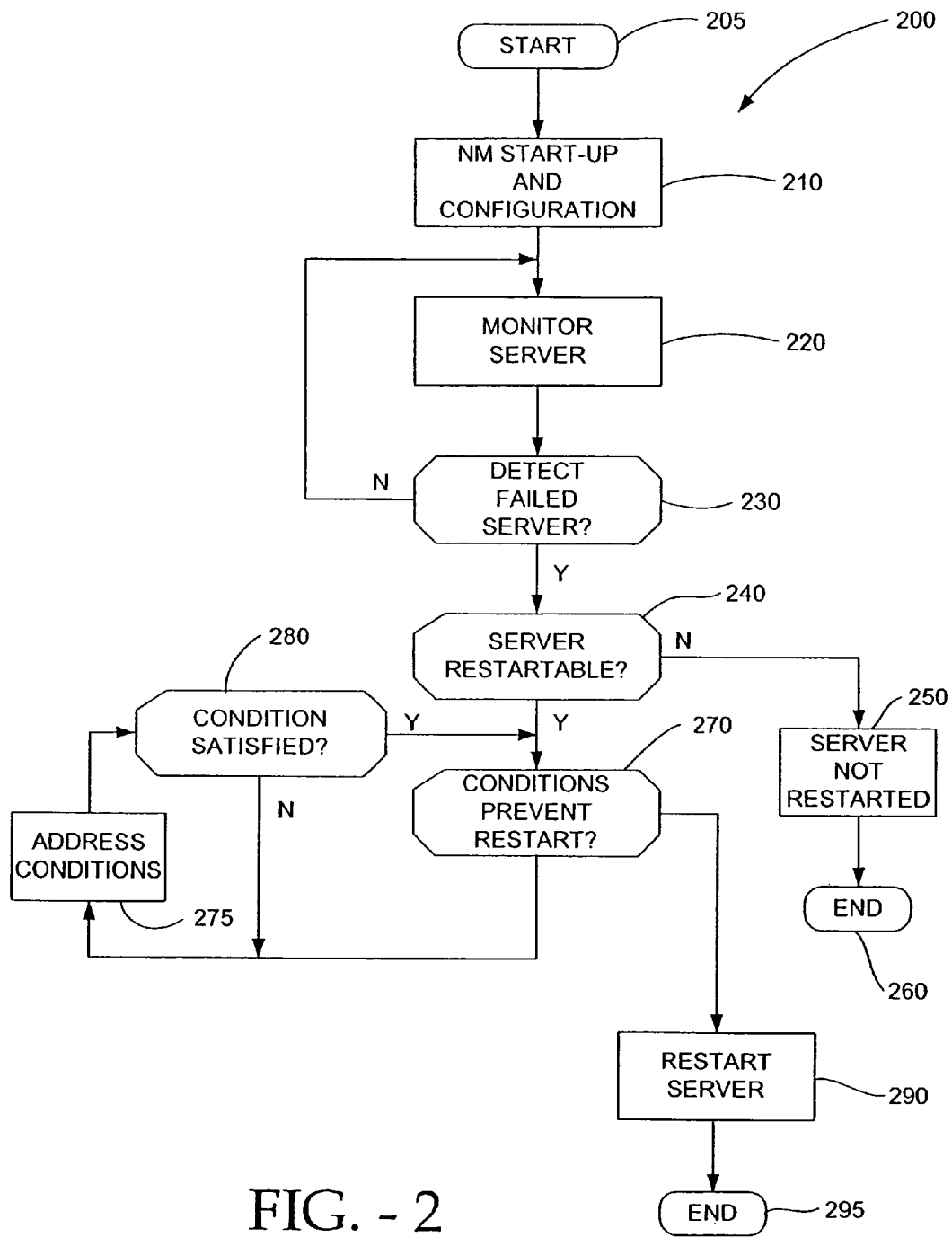
FIG. 2 is a diagram showing the operation of the automatic monitoring system of a Node Manager in accordance with one embodiment of the present invention.

In accordance with one embodiment of the present invention, the operation of an automatic monitoring system for detecting failed servers in the self health monitoring system of FIG. 1 is shown in flow chart 200 of FIG. 2 and described as follows. The operation of an NM starts at step 205. Next, the NM undergoes start-up and configuration operations in step 210. In one embodiment of the present invention, the NM receives instructions from an AS at start-up. The AS may instruct the NM to start an instance on a local machine. The AS may also instruct the NM to provide information to the AS regarding servers previously monitored during previous monitoring periods by the NM. The NM may assume that all of the monitored servers are alive upon NM startup and sets each server state to "unknown". In step 220, the NM begins monitoring a server. In one embodiment, the server is monitored over an SSL connection established with the server. In another embodiment, the server is monitored over a plain text protocol connection or some other type of connection.

The NM determines if a server has failed in step 230. In one embodiment, the server failure is detected by a breakdown of the connection between the NM and the server. In these embodiments, the NM monitors the server by confirming the integrity of the connection between the NM and the server. When the server being monitored dies, the NM is notified accordingly. In one embodiment, the NM receives an IOException error when the server dies. The integrity of the connection may also be verified in other ways, all considered within the scope of the invention. If the NM does not detect a failed server, operation of the system returns to step 220 to continue monitoring the server.

If the NM does detect a failed server in step 230, the NM will determine if the server is restartable in step 240. In one embodiment, a restart parameter specifies whether the server should be restarted upon detecting a server failure. The restart parameter may reside on the server, the NM, or in some other memory location. The parameter may be defined per server instance or for a number of servers. The parameter may also be modifiable at runtime though commands issued through the AS. If the server is not restartable, operation continues to step 250 and the server is not restarted. In one embodiment, a message is written to a log file indicating that the server is not restartable and no further action is taken by the NM towards the failed server. Once the event is recorded, the process ends at step 260 and the NM ceases monitoring the failed server. Though no further action is performed on the server at step 260, the server may be monitored again beginning at step 220 if the server is restarted or at step 205 if the NM is restarted.

If the server is deemed restartable in step 240, operation of the system continues to step 270. At step 270, the system checks to confirm that no other conditions exist to prevent the server from being restarted. If at step 270 any conditions exist preventing a server restart, then system operation proceeds to step 275. In step 275, an action or inaction is taken to address the condition that is preventing the server from being restarted. The action or inaction may be taken by either the NM, AS, or some other server. After the condition is addressed in step 275, the system determines whether the condition is satisfied in step 280. If the condition is not satisfied in step 280, operation returns to step 275. If the condition is satisfied in step 280, operation continues to step 270. In one embodiment of the present invention, operation continues from step 275 to step 270 whether the condition is satisfied or not. In yet another embodiment of the present invention, the NM will check to see if the server may be restarted after each time a restart is considered in step 270. In this embodiment (not shown), operation continues from step 275 or step 280 to step 240. In any case, the results of step 280 may be recorded in a log or memory as either condition satisfied, condition not satisfied, or some other message. If at step 270 the conditions are satisfied, then operation continues to step 290.

In one embodiment, system conditions may exist at step 270 that limit the server to a maximum number of restarts allowed during a period of time. In this case, parameters may control the maximum number of server restarts permitted within the period of time and the length of the time period. The number of actual restarts for a particular server may be indicated by a restart counter. If at step 270, the value in the maximum restarts allowed parameter is larger than the restart counter, then the maximum number of restarts has not occurred during the current time period and the process continues to step 290. If the restart counter value is larger than the maximum number of server restarts permitted within the particular time period, then operation continues to step 280. Operation of the system may remain at step 280 until the current time period has elapsed. Once the time period has elapsed, the restart counter is reset to zero and the time period begins again. The system then continues to step 270. At step 270, the restart counter is again compared to the maximum number of restarts parameter and operation continues accordingly. In another embodiment, system operation will continue past step 280 even though the maximum start parameter has been exceeded. In this case, a message is logged regarding this event and operation continues. System operation in this embodiment will consist of a loop between step 270 and step 280 until the time period has elapsed and the restart counter is reset to zero.

At step 290, the server is restarted. Then, the NM, server, or AS may perform actions or process events. In one embodiment, the server restart counter is incremented. In another embodiment, certain server parameters may be configured to take effect upon the next server incarnation.

Parameters determine how a NM is to act upon detecting server failure. Examples of these parameters in one embodiment of the present invention are shown below. These parameters can be defined per server instance and modified at runtime via the Admin Console.

AutoRestartEnabled=<true|false>

This parameter specifies whether the servers are restartable or not. In one embodiment, the default is true.

RestartIntervalSeconds=<number of seconds>

If a Server is restartable, this parameter specifies that it can be restarted RestartMax times within the specified number of seconds. In one embodiment, the default is 3600 seconds (60 minutes).

RestartMax=<number>

If Servers are restartable, this parameter specifies the max # times a Server can be started within the period specified by RestartIntervalSeconds. In one embodiment, the default is 2.

Certain methods implemented in java may be used to access or modify the parameter examples listed above. Examples of these methods include boolean getAutoRestartEnabled( ), void setAutoRestartEnabled(boolean), int getRestartIntervalSeconds( ), void setRestartIntervalSeconds(int), int getRestartMax( ), and void setRestartMax(int).

Figure 3:
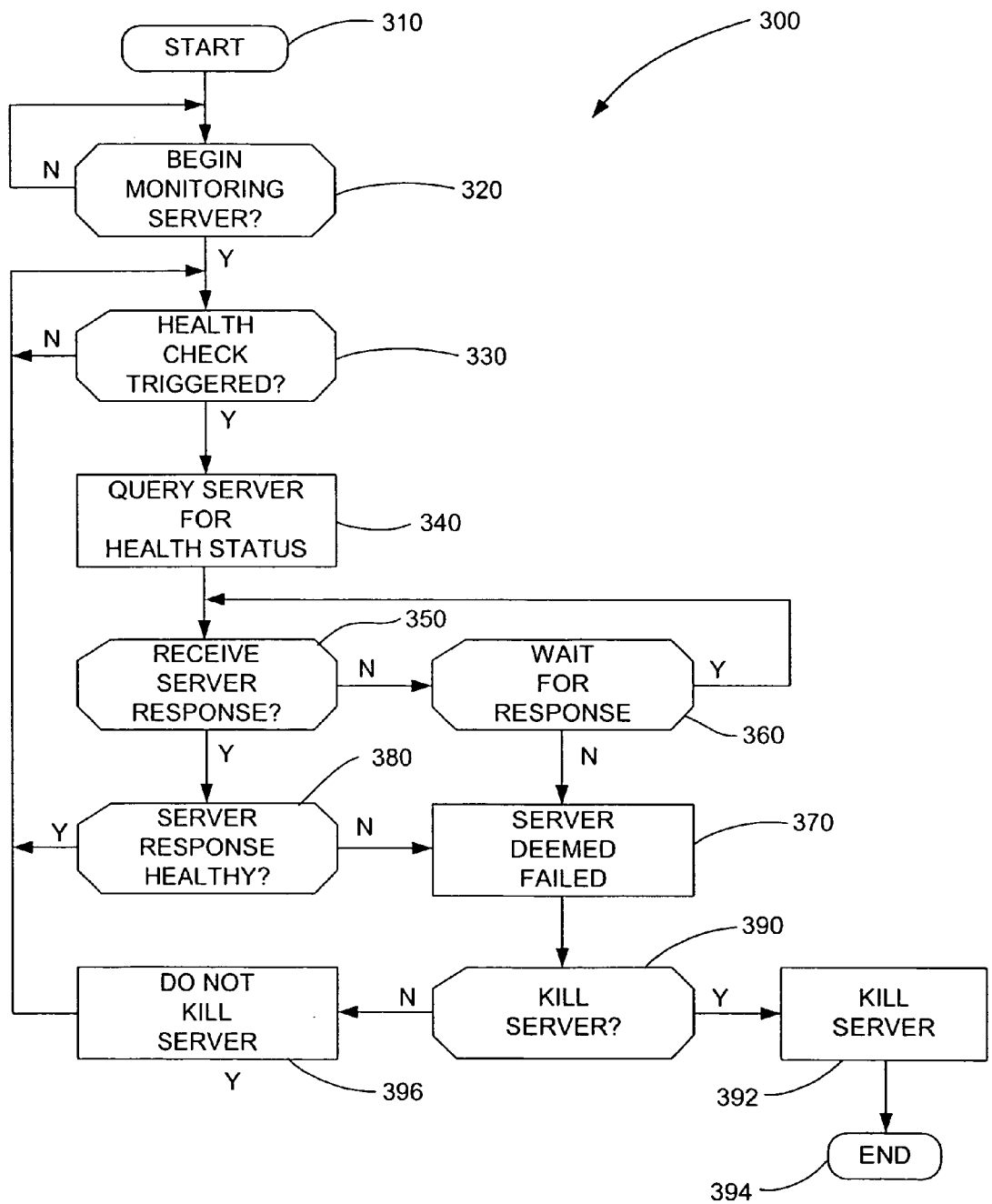
FIG. 3 is a diagram showing the operation of a health monitoring and corrective action system of a Node Manager in accordance with one embodiment of the present invention.

In addition to detecting the failure of a server, the NM may monitor the health of a server or perform maintenance on a server. The NM may monitor server health or perform server maintenance without detecting a change or degradation in the health status of the server. Server maintenance and monitoring may be performed simultaneously on multiple servers at any time. The simultaneous monitoring and maintenance may be synchronous or asynchronous. The operation of a system for monitoring the health of a server with a NM in accordance with one embodiment of the present invention is shown in diagram 300 of FIG. 3 and described as follows. Health monitoring system operation 300 starts off with a start step 310. Next, the system determines whether the NM should begin monitoring a server in step 320. If the system determines the NM should monitor the particular server, operation continues to step 330. If the system determines the particular server should not be monitored at the current time, the NM will not monitor the current server. In one embodiment, a server will not be monitored until a period of time has passed since the server has been restarted. In this case, a monitor delay parameter will determine the period of time the NM shall wait before monitoring the restarted server. The delay parameter maybe stored by the AS, NM, or the server itself. The delay parameter may correspond to a particular server or several servers. In one embodiment of the present invention, the value of the delay parameter may be modified at server runtime.

Next, the NM determines if a health check is triggered for a particular server in operation 330. A health check may be triggered by an internal event in the NM. In another embodiment, the health check is triggered by an external event occurring outside the NM, the occurrence of which is communicated to the NM. In one embodiment, a health check is triggered for a server after a period of time has elapsed. In this case, a health check interval parameter may specify a period of time. The expiration of the time period specified by the interval parameter will trigger a health check for a server. In one embodiment, an interval parameter corresponds to a single server. In another embodiment, an interval parameter corresponds to several servers. In any case, the interval parameter may be modified at server runtime. If a health check is not triggered in step 330, the system continues in a standby state waiting for a triggering event to occur regarding a particular server. If a health check triggering event does occur, system operation continues to step 340.

In step 340, the NM queries a server for it's health status. In one embodiment of the present invention, the NM invokes a java servlet located on the server to return the server's health status to the NM. This java servlet is an asynchronous servlet that will return the server's health information upon the occurrence of a particular event. In one embodiment, the event is the elapse of a period of time. The NM may inquire about the server's health status by communicating with the server itself or a server self health monitor application running on the server. The query may be transmitted over a TCP connection established between the NM and server or in some other manner. After querying the server for it's health status, the NM determines if a response is received from the server in step 350. In one embodiment, there are at least three possible response scenarios between the NM and the server subject to the NM's inquiry. In the first scenario, the server may be unable to receive the NM's query. The server may be too busy to accept a connection from the NM. In another scenario, the server may have failed and be unable to accept an NM connection request. In either case, the NM may throw an IOException and consider the server as "failed". The NM would then set an internal value of the server state to "failed". In the final scenario, no response is received from the server although the NM and server have established an initial connection. In this case, the NM will wait for a response from the server for a specified period of time. In one embodiment, a timeout parameter may specify the period of time the NM will wait for a response from the server. Until the length of time specified in the timeout parameter has transpired, the NM will continue to wait for a response as indicated in the loop of steps 350 and 360. If the NM has not received a response from the server in step 350 and the NM has determined not to wait any longer to receive a response in operation 360, operation continues to step 370 where the server is deemed failed. In one embodiment, the NM may attempt to inquire about the delay of the response or resend a health inquiry to the server before proceeding from to 370. In this embodiment, the NM may proceed to step 350, 360, or 380 depending on the result of the delay inquiry or the health inquiry.

If the NM does receive a response in step 350, operation flows to step 380 where the NM interprets the server's response. The NM interprets the server's response to determine if the server is healthy. If the NM determines the server is healthy from the response received by the server, operation flows to step 330 where the NM waits for another health check to be triggered. If the NM determines that the server is not healthy in step 380, operation continues to step 370. In step 370, the NM deems the server has failed. In one embodiment, the NM sets a parameter indicating the state of the particular server to "failed". The parameter may be stored internally within the NM, in the AS, or at some other memory location. Once deemed failed, operation continues to step 390 where the NM determines whether to terminate the server. In one embodiment, the NM contains an auto-terminate parameter. The auto-terminate parameter may relate to a single server or multiple servers at once. A user may set a value for the auto-terminate parameter or the parameter may be preset by the system. If the auto-terminate parameter indicates the server should not be terminated upon server failure, then operation continues to step 396. In one embodiment of the present invention, the system enters a message in a log indicating the failed status of the server and that the server is not to be restarted. After step 396, system operation proceeds to step 330. If the auto-terminate parameter indicates the server should be terminated upon server failure in step 390, then operation continues to step 392. The failed server is terminated in step 392. In one embodiment of the present invention, an entry is made to a log indicating the server is deemed failed and that the server was terminated. Monitoring of the terminated server ends in step 394. Once the server is terminated, the automatic detection system of FIG. 1 may detect the terminated server at step 230. The NM may then proceed to determine whether to restart the server as shown in FIG. 1.

In one embodiment of the present invention, certain parameters will control how the server periodically checks the servers running on the local machine. Examples of parameters controlling the check are shown below.

HealthCheckIntervalSeconds=<number of seconds>

This parameter specifies the interval of time (in seconds) between which periodic scans are done by NM to check if Servers are Failed. In one embodiment, the default is 180 seconds.

HealthCheckTimeoutSeconds=<number of seconds>

This parameter specifies the length of time (in seconds) the Node Manager will wait for a response to the health check query after which it will deem the monitored server Failed. In one embodiment, the default is 60 seconds.

AutoKillIfFailedEnabled=<true|false>

This parameter specifies if a Server is deemed Failed, this parameter will control whether NM will kill the Server or not. In one embodiment, the default is false.

HealthCheckStartDelaySeconds=<number of seconds>

The time that a server takes to startup depends upon the applications being deployed on it. The NM will wait for a server to complete its startup before the NM starts monitoring the server. This parameter specifies the length of time (in seconds) the NM will wait before starting its monitoring of the server. In one embodiment, the default is 120 seconds.

The HealthCheckIntervalSeconds and HealthCheckTimeoutSeconds and parameters can be defined per NM and on the NM command line. The AutoKillIfFailedEnabled and HealthCheckStartDelaySeconds parameters can be defined per server instance and can be modified at runtime via the Admin Console. These new parameters for the Server will be modifiable at runtime via the Admin Console. In conjunction with the parameter examples above, methods implemented in java code can be added to the server MBean and may be used to access or modify the parameters. Examples of these java methods include boolean getAutoKillIfFailedEnabled( ), void setAutoKillIfFailedEnabled (boolean), int getHealthCheckStartDelaySeconds( ), and void setHealthCheckStartDelaySeconds (int secs).

In one embodiment, the NM may allow its functionality and access to server health information to become available to external administrative clients. External administrative clients such as third party application monitors and high availability frameworks may need to be able to start and kill servers using the functionality of the NM. In one embodiment of the present invention, this is done programmatically with runtime MBeans. Use of an admin console is not required. The MBeans provide a programmatic interface to the NM's functionality. Further, the MBeans allow the NM's record of a server's health to be shared. Internal or external administrative clients may use the MBeans to access server health information collected by the NM. In one embodiment, the AS hosts [one]a NodeManagerRuntime MBean that provides methods to accomplish different tasks. Each machine may have one such MBean. [One task may involve starting a specified server.] In one embodiment, the AS may have methods according to the examples shown below.

java.io.reader start(serverMBean server) throws NodeManagerException;

This method starts the specified server. It then returns the reader to local log file containing output of executed command. The method throws NodeManagerException if any error occurs.

java.io.reader starInStandby (serverMBean server) throws NodeManagerException;

This method starts the specified server in Standby Mode. It then returns the reader to local log file containing output of executed command. The method throws NodeManagerException if any error occurs.

java.io.Reader shutdown (ServerMBean server) throws NodeManagerException;

This method shuts down the specified server. It then returns the reader to local log file containing output of executed command. The method throws NodeManagerException if any error occurs.

java.io.reader kill(ServerMBean server) throws NodeManagerException;

This method kills specified server. It is used to kill the server process when the server does not respond to shutdown operation. It then returns the reader to local log file containing output of executed command. The method throws NodeManagerException if any error occurs.

java.io.reader startMonitoring (ServerMBean server) throws NodeManagerException;

This method instructs the NM to start monitoring the specified server. The NM will automatically restart the server if it crashes (if auto restartEnabled is set to true) or gets into failed state (if AutoKillIfFailedEnabled and AutoRestartEnabled are set to true). It then returns the reader to local log file containing output of executed command. The method throws NodeManagerException if any error occurs.

java.io.reader stopmonitoring (serverMBean server) throws NodeManagerException;

This method instructs the NM to stop monitoring the specified server. It then returns the reader to local log file containing output of executed command. The method throws NodeManagerException if any error occurs.

java.io.Reader getlogs(Server MBean server, String type) throws NodeManagerException;

This method get logs from the NM for the specified server. The type is either "WL_output" or "WL_Error". It then returns the reader to local log file containing output of executed command. The method throws NodeManagerException if any error occurs.

string get state (ServerMBean server) throws NodeManagerException;

This method queries the NM for its view of the specified server state. It is used when the server does not respond to queries to its ServerRuntimeMBean. The method will return "unknown" if NM is either not monitoring the server or does not have any knowledge of the server. It then returns the reader to local log file containing output of executed command. The method throws NodeManagerException if any error occurs.

In another embodiment, MBeans may provide an interface for JMX clients to access the functionality of the NM. In this case, the MBeans for JMX client interfacing may have a different interface than the Server configuration MBeans. Operations such as "start" and "shutdown" may return precise information on their success or failure. They will throw an exception if the operation fails. All operations on the Node Manager Runtime MBeans may be blocking. A TaskMBean interface may be provided around the Server Lifecycle MBeans to provide an asynchronous interface to JMX clients. JMX clients can make use of the NM functionality to perform a wide variety of Server lifecycle and health monitoring control operations. Detailed below are the interactions between these two entities during each of the Server Lifecycle state transitions. Admin console, weblogic.Admin command line utility and other Admin Clients will be effecting these state transitions by invoking methods on the ServerLifecycleRuntimeMBean.

start( )[SHUTDOWN→RUNNING]

startInStandby( )[SHUTDOWN→STANDBY]

ServerLifecycleRuntimeMBean hosted on the Admin Server will invoke the start( ) or startInStandby( ) methods on the corresponding NodeManagerRuntimeMBean.

shutdown( )[STANDBY→SHUTDOWN]

If a NM is configured, ServerLifecycleRuntimeMBean hosted on the Admin Server will invoke the shutdown( ) method on the corresponding NodeManagerRuntimeMBean. If not, it will invoke the shutdown( ) method on the ServerLifecycleRuntimeMBean hosted on the Managed Server.

getState( )

ServerLifecycleRuntimeMBean hosted on the Managed Server will return the State attribute of the Server. ServerLifecycleRuntimeMBean hosted on the Admin Server will invoke the getState( ) method on the ServerLifecycleRuntimeMBean hosted on the Managed Server. If this operation times out, it will then invoke the getState( ) method on the NodeManagerRuntimeMBean.

Figure 4:
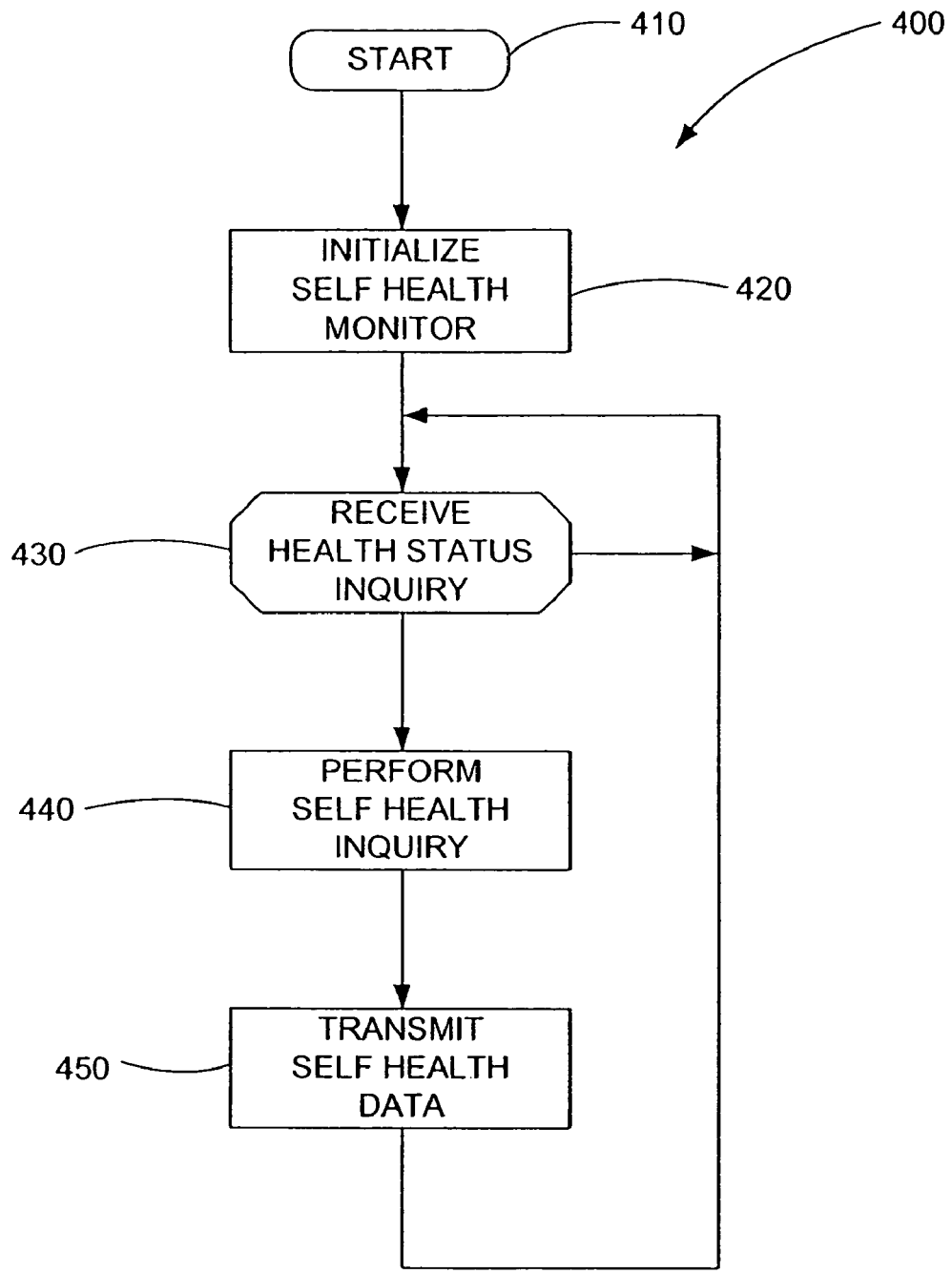
FIG. 4 is a diagram showing the operation of a managed server in a health monitoring system in accordance with one embodiment of the present invention.

The operation of a server that is monitored by a NM in accordance with one embodiment of the present invention is shown in diagram 400 of FIG. 4 and described as follows. The operation of flow chart 400 starts off with a start step 410. Next, the server is initialized in step 420. In one embodiment, the NM and the server establish a connection as part of the server initialization. While establishing the connection and initializing the server, the NM may pass the NM's listening address to the server. In one embodiment, server initialization includes the server initializing and running a program that monitors its health and interfaces with query attempts from the NM and other sources. Once a connection between the NM and the server is established and the server is initialized, the server may send a message to the NM indicating the server experienced a successful start up.

After initialization, the server listens for an inquiry regarding the server's health status in step 430. The health status inquiry may come from the NM or an external administrative agent. If no health status inquiry is received, the server continues to listen for an inquiry as shown in FIG. 4. If a health status inquiry is received, operation continues to step 440. In step 440, the server performs a self health check on itself. Next, the results of the health check are transmitted by the server in step 450. In one embodiment, the results are transmitted to the NM or the AS. In another embodiment, the results are transmitted according to the instructions of an external administrative agent. The administrative agent may have the results sent to the agent itself or some other entity. After transmitting the results of the self health inquiry, operation of the server returns to step 430 where the server listens for a health status inquiry. In one embodiment, if at any point the server fails, the server will inform the NM as soon as it enters a failed state.

Figure 5:
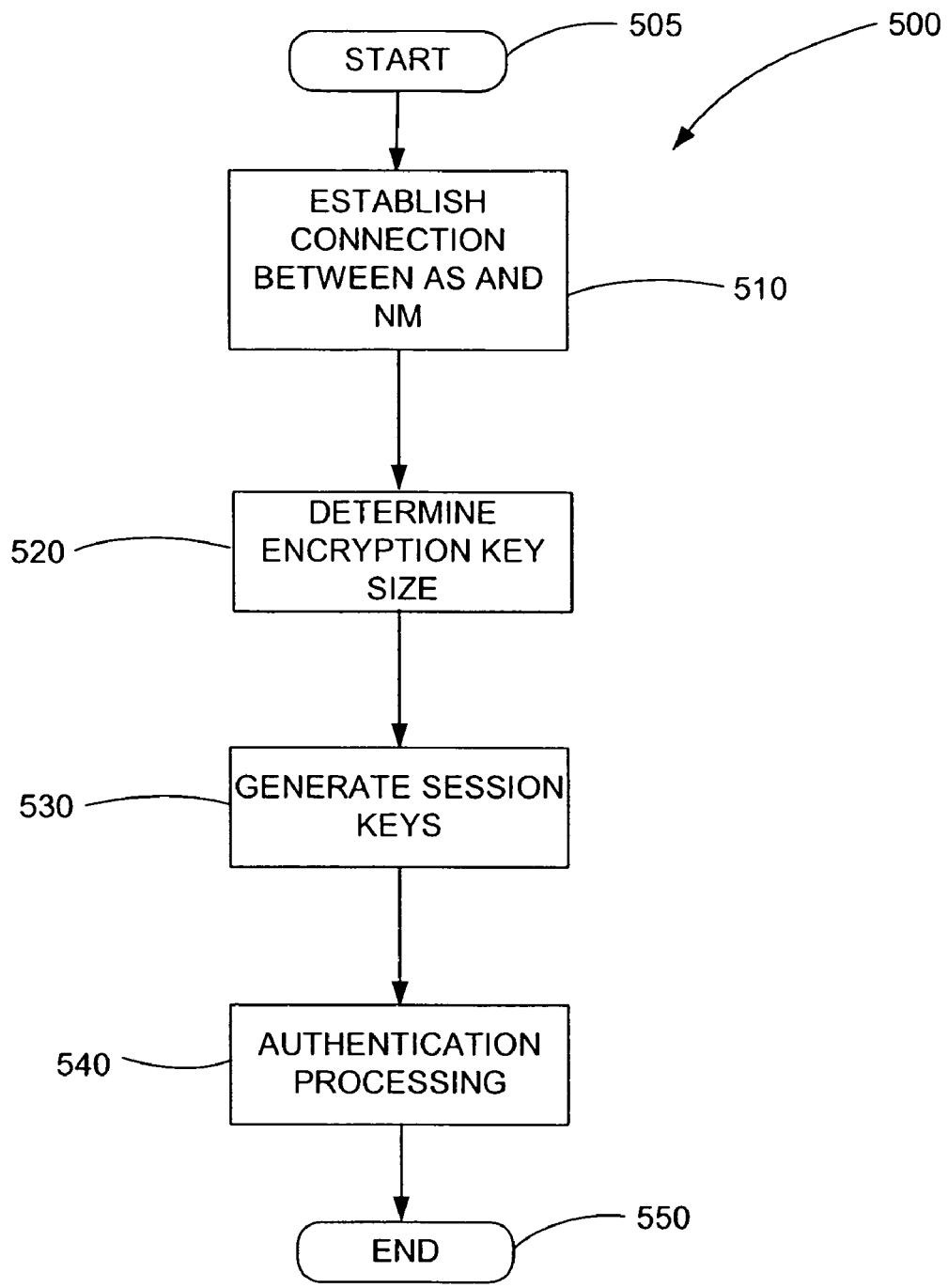
FIG. 5 is a diagram showing an encryption method for a self health monitoring system in accordance with one embodiment of the present invention.

The communication between the NM and the AS may be encoded to increase the integrity of the system. In one embodiment of the present invention, the communication may be encoded according to a Diffie-Helman based Authentication and Encryption scheme. The encryption parameters may be negotiated at link establishment time and depend upon configuration parameters and installed software. A flow chart showing the operation of a Diffie-Helman based Authentication and Encryption scheme 500 in accordance with one embodiment of the present invention is shown in FIG. 5. The operation starts at step 505. Next, the connection between the AS and NM is established in operation 510. In one embodiment, the connection between the AS and the NM is initialized by the AS. Once the connection has been initialized by the AS, the NM receives the initial connection. Next, the encryption key size is determined in step 520. In one embodiment, the encryption key size is determined by a negotiation between the AS and the NM.

The AS and NM each have a minimum key length parameter and maximum key length parameter. The pair for each of the NM and AS is denoted as (min, max). The minimum key length parameter is the minimum encryption level a process will support. The maximum key length parameter is the maximum encryption level a process is will support. In one embodiment, the possible key lengths are 0, 40, or 128 bits. The AS and NM will negotiate a connection that uses an encryption level as high as the lowest maximum key length between the NM and AS, but no lower than the highest minimum key length between the NM and AS. For example, if the AS has key length parameters of (0, 128), and the NM has key length parameters of (40, 128), the connection may have a key length of 40 or more preferably 128 bits. The key length may not be 0 bits because the NM has a minimum key length parameter of 40 bits. Once the key length for the connection has been established, the key length is in effect for the lifetime of the connection between the AS and NM. In one embodiment, the maximum key length parameter may be reduced by the capabilities of software installed on the NM or the AS. If the minimum key length parameter for either the AS or NM is higher than the maximum key length parameter for the other of the AS or NM, then no overlap exists in key length parameters. If there is no overlap in key length parameters, the established link will fail and an appropriate error message is logged. In one embodiment, command line arguments may be used to specify the minimum encryption level parameter and maximum encryption level parameter.

After the key size is determined, the session keys are generated in step 530. In one embodiment, a first session key is used for transmitted data from the AS to the NM and a second session key is used from for data transmitted from the NM to the AS. In one embodiment of the present invention, the session keys are 128 bits. The input parameters to the Diffie-Hellman key agreement algorithm may be fixed or generated. In one embodiment, the input parameters are fixed into software existing on the server network and accessible to the AS. The AS server may transmit the fixed input parameters to the NM. The Diffie-Hellman algorithm also requires the generation of a random number. In one embodiment, the random number is generated from a cryptographically secure pseudo-random number source. An RC4 bulk encryption method may be used as the encryption method for the link. The details of generating a session key using the Diffie-Hellman algorithm are generally known in the art and therefore not described here in detail.

Once the session keys are generated in step 530, the NM and AS may engage in an authentication process at step 540. In one embodiment, both the NM and AS are authenticated using a shared secret. One method of authenticating both the NM and AS in accordance with the present invention is as follows. First, both the NM and AS will generate a fingerprint. In one embodiment, the fingerprint maybe a 128 bit MD5 message digest created using the send and receive session keys already negotiated. Next, the AS will generate a challenge, encrypt the challenge and fingerprint, and send the encrypted challenge and fingerprint to the NM. In one embodiment, the challenge may be a 64 bit random number. Next, the NM will receive and decrypt the challenge and fingerprint from the AS. The information may be encrypted and decrypted using the AS's password. If the information received by the NM is decrypted and does not match the NM's fingerprint, the NM will reject the authentication request by the AS. Next, the NM will encrypt the challenge received from the server, the session key generated by the NM, and the fingerprint generated by the NM. The NM will then send the encrypted challenge, session key, and fingerprint to the AS. The AS will receive and decrypt the information received from the NM. Upon decrypting the received information, the AS will compare the received challenge and fingerprint to it's own challenge and fingerprint. If either the fingerprints or the challenges do not match, the AS will reject the authentication request from the NM. If the comparisons performed by the AS and NM reveal matching information, then the authentication requests will be accepted. The encryption and authentication process then ends at step 550. The encryption by the AS and NM may be done using a DES encryption method or some other method suitable for the particular requirements of the system.

In one embodiment, new command line arguments are specified for the AS and NM regarding AS/NM communication encryption and authentication. These new arguments can be modified at runtime via the Admin Console. Arguments specified for the AS may include the examples listed below.

WebLogic.management.minEncryptionBits=<number>

This argument specifies the minimum encryption level the process will accept. Possible values are 0, 40, 128. In one embodiment, the default value is 0.

WebLogic.management.maxEncryptionBits=<number>

This argument specifies the maximum encryption level the process will accept. Possible values are 0, 40, 128. In one embodiment, the default value is 128.

WebLogic.management.enableChannelBinding=0|1

This argument sets an Authentication Protocol. In one embodiment, the a value of 1 enables the Authentication Protocol and the default is 0.

WebLogic.management.passwordKey=<string>

This argument specifies the key to be used to decrypt the encrypted NM passwords stored in the configuration file. The key must be specified if WebLogic.management.enableChannelBinding is set to 1.

The utility WebLogic.wtc.gwt.genpasswd will be used to encrypt NM passwords to be stored in the configuration file.

Arguments specified for the NM may include the examples listed below.

WebLogic.nodemanager.minEncryptionBits=<number>

This argument specifies the minimum encryption level the process will accept. Possible values are 0, 40, 128. In one embodiment, the default value is 0.

WebLogic.nodemanager.maxEncryptionBits=<number>

This argument specifies the maximum encryption level the process will accept. Possible values are 0, 40, 128. In one embodiment, the default value is 128.

WebLogic.nodemanager.enableChannelBinding=0|1

This argument sets an Authentication Protocol enable. In one embodiment, a value of 1 enables the Authentication Protocol and the default is 0.

WebLogic. nodemanager.password=<string>

This argument specifies the NM password. The NM password must be specified if WebLogic.nodemanager.enableChannelBinding is set to 1.

WebLogic.nodemanager.adminServerPassword=<string>

This argument specifies the Admin Server password. Must be specified if WebLogic.nodemanager.enableChannelBinding is set to 1.

In one embodiment, an alternate NM may have features in addition to those described above. In particular, the alternate NM may function to aggregate administrative actions and information in the NM. The actions and information could then be accessed by third party application monitors and high availability frameworks using standard JMX interfaces. The NM may also achieve internal interactions with the admin console and cluster group leader using standard JMX interfaces.

In one embodiment, certain services are required by the administrator for the alternate NM to operate properly. One such service is a ProcessControl ("PC") service. The PC service operates to start, kill and restart managed servers on the local node. The service can be hosted by the AS and by the NM on the other nodes. Restart capability is provided to internal and external clients via Runtime MBeans. Another service is the HealthMonitoring ("HM") service. The HS service monitors state and other runtime attributes of managed servers on local or remote nodes. Either the AS or an individual NM can host the HM service. Server health information is provided to internal and external clients via Runtime MBeans.

The alternate NM has several advantageous characteristics. In one embodiment, some aspects of the configuration for the alternate NM are similar to the basic NM of the present invention. The alternate NM may be hosted on a stripped-down managed server. In this case, the alternate NM registers as a managed server with the AS. With this configuration, the NM performs startup independently of the AS. Further, no configuration MBeans are required for runtime configuration changes The alternate NM may include a "watchdog" service. The watchdog service operates to monitor the NM on platforms where operating system monitoring is not available, such as non-NT and Solaris platforms. The watchdog service may be configured to spawn the NM when it performs startup, thereby allowing administrators to manually start just one process. In one embodiment, a system could use a watchdog service to bootstrap the NM service on a local node upon command of an AS. This watchdog service configuration would eliminate manual configuration of the NM on each remote node and allow runtime configuration through configuration MBeans implemented in java. For Solaris and NT systems, the NM maybe used as the operating system in one embodiment of the present invention. In this case, the NM may be installed on a node in conjunction with other software and can be started manually.

The alternate NM can be configured to enable its operation to enhance aspects of an entire domain or local node. One NM could be used for an entire domain. This would simplify security in that multiple certificates would not need to be managed. In one embodiment, the NM is the highest release. The alternate NM may be used to aggregate cluster heartbeats for all cluster members on a local node. The cluster members may include managed servers on the local node. The alternate NM may also be configured to operate as a surrogate AS.

The present invention includes a Node Manager that monitors the status of multiple servers. The NM detects server failures, periodically monitors server health status, and performs server maintenance. When the NM detects a server failure, it determines whether or not the server should be restarted. While periodically monitoring servers, the NM may determine how often to trigger a health check, how long to wait for a response, and how to proceed if the server is deemed failed. The NM may be controlled by an AS directly or by an external administrative agent. An administrative agent may control the NM by interfacing with the AS. The NM and AS may authenticate each other and encode their communications to each other for increased security.

An Appendix is attached to this application containing examples within the scope and spirit of the present invention.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for implementing Node Managers.

Included in the programming (software) of the general/specialized computer or microprocessor are software modules for implementing the teachings of the present invention, including, but not limited to, separating planes of a source image, averaging at least one of foreground and background colors, replacing colors, and compensating for error introduced by color replacement in one plane by feeding error into a second plane, storage, communication of results, and reconstructing an image according to the processes of the present invention.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

APPENDIX

1 Product Perspective (O)
The existing NM implementation enables the administrator to start and kill Servers remotely from the Administration Console. However, there is no automatic monitoring or restart of these Servers after that.
The goal of this release is to improve the availability of these Servers by monitoring them and automatically restarting them if necessary.
In addition, NM's functionality and information will be exposed to JMX clients via new runtime MBeans.
1.1 Product Functions (O)
1.1.1 Automatic detection and restart of crashed servers
NM will continuously monitor Servers running on the local machine and will automatically detect and restart failed Servers. This detection and restart will occur as soon as NM detects the Server failure.
1.1.2 Monitoring and restart of Failed servers
NM will periodically monitor Servers running on the local machine and will automatically detect and restart Failed Servers. This detectionand restart will occur as soon as possible after the Server is deemed to be Failed.
1.1.3 Node Manager Runtime MBeans
New Node Manager Runtime MBeans will be provided. They will be hosted on the Admin Server and will offer methods that wrap NM functionality and expose the health information collected by NM.
2 Automatic Detection and Restart of Failed Servers
2.1 Functional Description
NM will continuously monitor Servers running on the local machine and will automatically detect and restart failed Servers. This detection and restart will occur as soon as NM detects the Server failure.
2.2 Functional Requirements
NM will continuously monitor Servers running on the local machine and will automatically detect and restart failed Servers. This detection and restart will occur as soon as possible after the Server failure.
Once a Server failure is detected, NM's actions will be controlled by these parameters:
AutoRestartEnabled=<true|false>
  Specifies whether Servers are restartable or not. Default is true.
RestartIntervalSeconds=<number of seconds>
If a Server is restartable, this parameter specifies that it can be restarted RestartMax times within the specified number of seconds. Default is 3600 seconds (60 minutes).
RestartMax=<number>
  If Servers are restartable, this parameter specifies the max # times a Server can be started within the period specified by RestartIntervalSeconds. Default is 2.
These parameters will be defined per Server instance. They will also be modifiable at runtime via the Admin Console.
2.3 Software Interfaces (Javadoc, MBean, Objects, Classes)
This feature has only an administrative interface, and it is via the new parameters described in section 3.2.
These new parameters for the Server will be modifiable at runtime via the Admin Console.
These methods will be added to the weblogic.management-.configuration.ServerMBean to access or modify these parameters:
boolean getAutoRestartEnabled( );
void setAutoRestartEnabled(boolean);
int getRestartIntervalSeconds( );
void setRestartIntervalSeconds(int);
int getRestartMax( );
void setRestartMax(int);
3. Monitoring and Restart of Failed Servers
3.1 Functional Description
NM will periodically monitor Servers running on the local machine and will automatically detect and restart Failed Servers. This detection and restart will occur as soon as possible after the Server is deemed to be Failed.
3.2 Functional Requirements
NM will periodically check Servers running on the local machine and will automatically detect and restart Failed Servers. This detection and restart will occur as soon as possible after the Server is deemed to be Failed.
This check will be controlled by these parameters:
HealthCheckIntervalSeconds=<number of seconds>
  The interval of time (in seconds) between which periodic scans are done by NM to check if Servers are Failed. Default is 180 seconds.
HealthCheckTimeoutSeconds=<number of seconds>
  The length of time (in seconds) the Node Manager will wait for a response to the health check query after which it will deem the monitored server Failed. Default is 60 seconds.
AutoKillIfFailedEnabled=<true|false>
  If a Server is deemed Failed, this parameter will control whether NM will kill the Server or not. Default is false.
The time that a Server takes to startup depends upon the applications being deployed on it. NM will wait for a Server to complete its startup before it (the NM) starts monitoring the Server. This wait time can be specified using the following parameter:
HealthCheckStartDelaySeconds=<number of seconds>
  The length of time (in seconds) the Node Manager will wait before starting its monitoring of the Server. Default is 120 seconds.
HealthCheckIntervalSeconds and HealthCheckTimeoutSeconds and parameters will be defined per NM, and can be specified on the NM command line.
AutoKillIfFailedEnabled and HealthCheckStartDelaySeconds parameters will be defined per Server instance and will be modifiable at runtime via the Admin Console.
After NM has killed a Failed server, its restartability is controlled by the parameters defined in section 3.2 above.
3.3 External Interface Requirements
3.3.1 Software Interfaces (Javadoc, MBean, Objects, Classes)
This feature has only an administrative interface, and it is via the new command line arguments described in section 4.2.
These new parameters for the Server will be modifiable at runtime via the Admin Console.
These methods will be added to the ServerMBean to access or modify these parameters:
boolean getAutoKillIfFailedEnabled( );
void setAutoKillIfFailedEnabled(boolean);
int getHealthCheckStartDelaySeconds( );
void setHealthCheckStartDelaySeconds(int secs);
4. Node Manager Runtime MBeans
4.1 Functional Description
These MBeans will serve the following purposes:
1. Expose NM functionality to external administrative clients
External administrative clients (3rd party application monitors, HA frameworks, etc.) need to be able to start and kill Servers using the NM. They should be able to do this progranimatically without using the admin console.

These MBeans will provide a programmatic interface to NM's functionality.

2. Expose NM's view of Server health

As described in section 4 above, NM periodically collects health information on Servers. Internal or external administrative clients (e.g., admin console) need to be able to access this information.

These MBeans will provide an interface to this information.

4.2 Functional Requirements

The Admin Server will host the new "NodeManagerRuntimeMBean". There will be one NodeManagerRuntimeMBean per machine in the domain.

This MBean will offer methods that wrap NM functionality and expose the health information collected by NM.

The ServerLifecycleRuntimeMBean hosted on the Admin Server will use these MBeans internally. They will NOT be exposed to external JMX clients.

4.3 External Interface Requirements 4.3.2 Software Interfaces (Javadoc, MBean, Objects, Classes)

public interface NodeManagerRuntimeMBean extends WebLogic management.runtime.RuntimeMBean Method Summary java.io.Reader start (ServerMBean server) throws NodeManagerException;
   starts the specified Server.
   Returns Reader to local log file containing output of executed command. Throws NodeManagerException if any error occurs.

java.io.Reader startInStandby(ServerMBean server) throws NodeManagerException;
   starts the specified Server in Standby state.
   Returns Reader to local log file containing output of executed command. Throws NodeManagerException if any error occurs.

java.io.Reader shutdown(ServerMBean server) throws NodeManagerException;
   shuts down the specified Server.
   Returns Reader to local log file containing output of executed command. Throws NodeManagerException if any error occurs.

java.io.Reader kill(ServerMBean server) throws NodeManagerException;
   kills the specified Server. Used to kill the server process when the server does not respond to shutdown operation.
   Returns Reader to local log file containing output of executed command. Throws NodeManagerException if any error occurs.

java.io.Reader startMonitoring(ServerMBean server) throws NodeManagerException;
   Instruct NM to start monitoring the specified server. NM will automatically restart the server if it crashes (if AutoRestartEnabled is set to true) or gets into Failed state (if AutoKillIfFailedEnabled and AutoRestartEnabled are set to true).
   Returns Reader to local log file containing output of executed command. Throws NodeManagerException if any error occurs.

java.io.Reader stopMonitoring(ServerMBean server) throws NodeManagerException;
   Instruct NM to stop monitoring the specified server.
   Returns Reader to local log file containing output of executed command. Throws NodeManagerException if any error occurs.

java.io.Reader getLogs(ServerMBean server, String type) throws NodeManagerException;
   Get logs from the NM for the specified server. The type is either "WL_output" or "WL_error".
   Returns Reader to log retrieved. Throws NodeManagerException if any error occurs. String getState(ServerMBean server) throws NodeManagerException;
   Query the NM for its view of specified server's state. Used when server does not respond to queries to its ServerRuntimeMBean.
   Will return "Unknown" if NM is either not monitoring or does not have any knowledge of the server. Throws NodeManagerException if any error occurs.

5.1 Node Manager-Managed Server communication 5.1.1 Health monitoring communication NM will periodically poll the Server to check its health. The algorithm used in this polling is as follows:

1. Upon startup, NM reads an on-disk file to retrieve information on Servers it was monitoring during its previous incarnation.
   It assumes that all of the monitored Servers are alive when it starts up. It assumes no knowledge of their current States (i.e., it sets its view of their State to "Unknown").

2. NM invokes the NMCommandServlet deployed on the Server. This is an asynchronous Servlet that will return the Server's health information after HealthCheckIntervalSeconds have elapsed.

3. One of the following happens when NM invokes the Servlet:

3.1 IOException is thrown.
   This could mean a number of different things:
      Server has crashed or is not running
      Server too busy to accept TCP connection
      Server has Failed, unable to accept TCP connection
      Transient IO exception
      All cases are treated as if Server has Failed. NM sets its internal value of Server state to "Failed".
   To handle "false negatives", NM kills the Server.
   If the Server's AutoKillIfFailedEnabled parameter is "true", NM sets its internal value of Server state to "Failed" and kills the Server.
   If AutoKillIfFailedEnabled is false, NM sets it internal value of Server state to "Failed Not Restartable", logs a warning and continues.

3.3 Server returns its State value after HealthCheckIntervalSeconds.

3.3.1 Server State is Running
   No action.

3.3.2 Server State is Failed
   If the Server's AutoKillIfFailedEnabled parameter is "true", NM sets its internal value of Server state to "Failed" and kills the Server.
   If AutoKillIfFailedEnabled is false, NM sets it internal value of Server state to "Failed Not Restartable", logs a warning and continues.

4. In the next iteration, if NM sees that its interval value of Server state is "Failed", it will try to restart the Server.
   NM checks the Server's AutoRestartEnabled parameter. If it is true and less than RestartMax restarts have been done in the current RestartIntervalSeconds window, NM will restart the Server.
   If Server has already been restarted RestartMax times in the current RestartIntervalSeconds window, NM will wait till the next RestartIntervalSeconds window begins before doing another restart.

If AutoRestartEnabled is false, NM will not restart the Server.

5.2.1 Server State transition notifications

When certain transitions occur in the Server's State value, it will inform the NM of them. This will be particularly useful in the following cases:

When the NM starts a Server, there is currently no mechanism to determine if the Server started successfully or not. Now, the Server will inform the NM once it has entered a Standby State.

If a Server fails, NM will discover this only in the next iteration of its health-monitoring query. Now, the Server will inform the NM as soon as it has entered a Failed State.

Passing the NM's listening address to the Server when the latter is starting up will facilitate this communication.

Impact on JMX clients p1 In WLS 6.1, JMX clients (like the Admin Console) performed Server lifecycle operations by invoking methods on the Server configuration MBeans. In Acadia, these clients will be accessing the new Server Lifecycle MBeans for this purpose.

These new MBeans have a different interface than the Server configuration MBeans.

Detailed below are the changed semantics:

Operations such as "start" and "shutdown" will now return precise information on their success or failure. They will throw an exception if the operation fails. Look at [SLC] for details.

All operations on the Node Manager Runtime MBeans are now blocking. A TaskMBean interface is being provided around the Server Lifecycle MBeans to provide an asynchronous interface to JMX clients.

The new Server Lifecycle and Node Manager Runtime MBeans provide a rich set of functionality. JMX clients can make use of these to perform a wide variety of Server lifecycle and health monitoring control operations. Look at [SLC] and section 5.2.3 above for details on this.

5.3 NM-Server Lifecycle Interactions

Detailed below are the interactions between these two entities during each of the Server Lifecycle state transitions.

Admin console, weblogic.Admin command line utility and other Admin Clients will be effecting these state transitions by invoking methods on the ServerLifecycleRuntimeMBean.

1. start( ) [SHUTDOWN->RUNNING]startInStandby( ) [SHUTDOWN->STANDBY]ServerLifecycleRuntimeMBean hosted on the Admin Server will invoke the start( ) or startInStandby() methods on the corresponding NodeManagerRuntimeMBean.

2. shutdown( ) [STANDBY->SHUTDOWN]
If a NM is configured, ServerLifecycleRuntimeMBean hosted on the Admin Server will invoke the shutdown( ) method on the corresponding NodeManagerRuntimeMBean. If not, it will invoke the shutdown( ) method on the ServerLifecycleRuntimeMBean hosted on the Managed Server.

3. getState( )
ServerLifecycleRuntimeMBean hosted on the Managed Server will return the State attribute of the Server.
ServerLifecycleRuntimeMBean hosted on the Admin Server will invoke the getState( ) method on the ServerLifecycleRuntimeMBean hosted on the Managed Server. If this operation times out, it will then invoke the getState( ) method on the NodeManagerRuntimeMBean.

6. Diffie-Hellman based Authentication/Encryption scheme

A Diffie-Hellman based Authentication/Encryption scheme was proposed as an alternative to the current X.509 Certificates based scheme.

After much discussion, it was decided that customers do not require this.

Detailed below is the proposal.

6.1 Functional Description

All data being sent over the network link between the Admin Server and NM will be encrypted using a new scheme based on the Diffie-Hellman algorithm. The encryption parameters will be negotiated at link establishment time and will depend upon configuration parameters and installed encryption software.

The Admin Server and NM will be authenticated with each other using a shared secret based mechanism.

6.2 Functional Requirements 6.2.1 Concepts and Definitions

Admin Server begins the communication session.

A NM receives the initial connection.

Both processes are aware of the encryption feature, and have two configuration parameters.

The first configuration parameter is the Minimum encryption level a process will accept. It is expressed as a key length: 0, 40, or 128 bits.

The second configuration parameter is the Maximum encryption level a process is willing to support. It also is expressed as a 0, 40, or 128 bit key size.

For convenience, this document will denote the two parameters as (mm, max). So (40, 128) means a process will accept at least 40-bit encryption but desires 128-bit if possible.

Encryption parameters negotiated are for the lifetime of the communication session.

6.2.2 Encryption Key Size Negotiation

The first step is for the two processes to agree on the largest common key size supported by both. This negotiation itself need not be encrypted or hidden.

A pre-processing step temporarily reduces the maximum key size parameter configured to agree with the installed software's capabilities. This must be done at link negotiation time, because at configuration time it may not be possible to verify a particular machine's installed encryption package. For example, the administrator may configure (0, 128) encryption for an unbooted machine that only has a 40-bit encryption package installed. When the machine actually negotiates a key size, it should represent itself as (0, 40). In some cases this may cause a run-time error; for example (128, 128) is not possible with a 40-bit encryption package.

The following table shows how the configured parameters are modified based on which encryption package is installed. This is a local computation that each process performs itself. The result serves as input for the subsequent cross-machine negotiation.

| configured parameters (min, max) | no encryption package installed | 40-bit encryption package installed | 128-bit encryption package installed |
|---|---|---|---|
| 0, 0 | 0, 0 | 0, 0 | 0, 0 |
| 0, 40 | 0, 0 | 0, 40 | 0, 40 |
| 0, 128 | 0, 0 | 0, 40, | 0, 128 |
| 40, 40 | error | 40, 40 | 40, 40 |
| 40, 128 | error | 40, 40 | 40, 128 |
| 128, 128 | error | error | 128, 128 |

Next the two processes jointly agree on the largest key size acceptable to both. It maybe that there is no overlap, in which case network link establishment fails (with an appropriate log error message). This table shows the outcome for all possible combinations of mm/max parameters:

|          | 0, 0  | 0, 40 | 0, 128 | 40, 40 | 40, 128 | 128, 128 |
|----------|-------|-------|--------|--------|---------|----------|
| 0, 0     | 0     | 0     | 0      | error  | error   | error    |
| 0, 40    | 0     | 40    | 40     | 40     | 40      | error    |
| 0, 128   | 0     | 40    | 128    | 40     | 128     | 128      |
| 40, 40   | error | 40    | 40     | 40     | 40      | error    |
| 40, 128  | error | 40    | 128    | 40     | 128     | 128      |
| 128, 128 | error | error | 128    | error  | 128     | 128      |

6.2.3 Session Key Agreement

Two session keys will be generated for the encrypted network link using the Diffie-Hellman algorithm. One session key will be used for data flowing from the Admin Server to the NM, and the other key will be used for traffic flowing in the reverse direction. The generated session keys will always be 128-bit.

Input parameters to the Diffie-Hellman key agreement algorithm will be fixed (burned-in to WebLogic software). Admin Server will transmit the parameters it wants to use to the NM. This permits the burned-in parameters to be changed in future releases.

The actual Diffie-Hellman parameters to bum-in for the first release of this feature are shown in Appendix A.

Diffie-Hellman session key agreement also requires a cryptographically secure pseudo-random number source. The seed value for the pseudo-random number generator must contain a large amount of unpredictable data, so that a network-based attacker cannot iterate through likely seed values.

6.2.6 40-bit Protocol Requirements

If a 40-bit key size is negotiated, the 128-bit session key produced by Diffie-Hellman should be used for RC4 bulk encryption. However, 88 bits must be disclosed in the clear in one of the link establishment messages. This allows an attacker to conduct a 40-bit brute-force key search. Security is better than with a simple 40-bit key, because the 88-bits act as salt and prevent an attacker from using pre-computed lookup tables.

A network attacker may not be permitted to defeat the 88-bit disclosure requirement by tampering with packets or deleting packets:

The actual bits disclosed in the clear must be used by the Admin Server. If they do not agree with the locally computed Diffie-Hellman session key, or are not supplied as expected, Admin Server will generate a log error message and terminate the connection.

Both the processes implicitly agree to permute their Diffie-Hellman session key when 40-bit encryption is negotiated, as shown below. This prevents a network attacker from tampering with messages and tricking the Admin Server into a 128-bit session when 40-bit was the NM s negotiation result.

6.2.7 Authentication Protocol

To guard against a Man-in-the-Middle attack, Admin Server and NM will be authenticated using a shared secret, as follows:

Both processes will generate a 128-bit MD5 message digest (fingerprint) using the send and receive session keys negotiated (see Section 6.2.3 above)

Admin Server will generate a 64-bit random number (challenge). It will then DES-encrypt the challenge and the fingerprint using its password as the key and send this to the NM.

NM will decrypt the received message with the Admin Server s password. If the fingerprints don t match, it will reject the authentication request.

NM will generate a 64-bit session key. NM will then DES-encrypt the previously-received challenge, the generated session key and the fingerprint using its password as the key and send this to the Admin Server.

Admin Server will decrypt the received message with the NM s password. It will check the received challenge and fingerprint with its local values. If either doesn'tt match, it will reject the authentication request.

If the above sequence is completed successfully, Admin Server and NM will be considered authenticated with each other.

6.3 External Interface Requirements 6.3.1 Hardware Interfaces (O)

6.3.2 Software Interfaces (Javadoc, MBean, Objects, Classes)

These new command line arguments will be specified for the Admin Server.

WebLogic.management.minEncryptionBits=<number>the Minimum encryption level the process will accept. Possible values are 0, 40, 128. Default value is 0.

WebLogic.management.maxEncryptionBits=<number>the Maximum encryption level the process will accept. Possible values are 0, 40, 128. Default value is 128.

WebLogic.management.enableChannelBinding=0|1 a value of 1 enables the Authentication Protocol (Section 5.2.7). Default is 0.

WebLogic.management.passwordKey=<string>key to be used to decrypt the encrypted NM passwords stored in the configuration file.

It must be specified if WebLogic.management.enableChannelBinding is set to 1.

The utility WebLogic.wtc.gwt.genpasswd will be used to encrypt NM passwords to be stored in the configuration file.

These new command line arguments will be specified for the NM.

WebLogic.nodemanager.minEncryptionBits=<number>the Minimum encryption level the process will accept. Possible values are 0, 40, 128. Default value is 0.

WebLogic. nodemanager.maxEncryptionBits=<number>the Maximum encryption level the process will accept. Possible values are 0, 40, 128. Default value is 128.

WebLogic.nodemanager.enableChannelBinding=0|1 a value of 1 enables the Authentication Protocol (Section 5.2.7). Default is 0.

WebLogic. nodemanager.password=<string>the NM s password.

Must be specified if WebLogic.nodemanager.enableChannelBinding is set to 1.

WebLogic.nodemanager.adminServerPassword <string>the Admin Server s password.

Must be specified if WebLogic.nodemanager.enableChannelBinding is set to 1.

These new arguments will be modifiable at runtime via the Admin Console.

7.5 Alternate Node Manager

In one embodiment of the invention, an alternate type of node manager architecture is used. The alternate node manager may be operable to achieve at least the following functions:

Aggregation of administrative actions and information in NM for access by 3$^{rd}$ party application monitors and HA frameworks using standard JMX interfaces Internal interactions with admin console, cluster group leader, etc. using standard JMX interfaces Described below are some of the design points of the new NM architecture.

Summary of New NM Architecture

Services required by Administrator/App Monitor

1. ProcessControl ("PC") service
    start, kill and restart Managed Svrs ("MS") on local node
    will be hosted by Admin Svr ("AS")
    will be hosted by NM on other nodes
    provide restart capability to internal and external clients via Runtime MBeans
2. HealthMonitoring ("HM") service
    monitor State and other runtime attributes of MS on local or remote node
    can be hosted either by AS or individual NMs
    provide this info to internal and external clients via Runtime MBeans New NM charactertistics 0. hosted on stripped-down MS
    registered as a MS with the AS (in config.xml)
1. Configuration
    all config passed as command line args (like for today's NM)
    startup independent of AS
    no Config MBeans for runtime configuration changes (like for today's NM)
2. WatchDog ("WD")
    reqd to mon NM on platforms where OS monitoring not avl (non NT and Solaris platforms)
    1 WD per NM
    can spawn the NM when started so Admins will have to manually start just 1 process
3. NM may be the OS service on NT and Solaris
    installed when installing WLS on node
    can also be started manually
4. Interoperability
    could have 1 NM per Domain
        (Security) won't have to manage multiple Certificates
    NM must be of highest release wrt all MSs on node
5. If NM is not used:
    won't get PC svc on remote nodes
    HM svc will won't be able to restart remote MSs
    better scalability if HM svc hosted on NMs
6. Additional Enhancements
    make NM highly preferable (advantages listed in #5)
    use WD to bootstrap NM on local node upon AS's command (will eliminate manual config of NM on each remote node and allow runtime config via Config MBeans)
    use NM to aggregate Cluster heartbeats for all cluster members on local node (broader implications-Eric/Mesut/Dean)
    make NM a surrogate AS? (broader implications)

What is claimed is:

1. A method for monitoring a server comprising:
    providing a monitoring instance to monitor at least one server;
    providing a triggering event that causes the monitoring instance to monitor the at least one server;
    determining the health status of the at least one server by invoking a servlet located on the server, the servlet configured to return a health status of the server to the monitoring instance;
    detecting degenerate health status of the at least one server and determining whether to restart the at least one server upon the detection of the degenerate health;
    determining for a server having a health status of degenerated whether any conditions exist that may limit the at least one server from being restarted; and
    performing treatment on the server, the treatment corresponding with the health status of the server, by determining a value of an auto-kill parameter, the value specified in the auto-kill parameter corresponding to whether the monitoring instance will automatically kill a server if the server is deemed failed.

2. The method of claim 1 wherein providing a triggering event includes determining a period of time has elapsed.

3. The method of claim 1 wherein providing a triggering event includes receiving a signal from an entity external to the monitoring object.

4. The method of claim 1 wherein determining the health status of a server further comprises:
    transmitting a query signal to the server to determine the serve's health status; and
    determining whether the server responds to the query signal.

5. The method of claim 4 wherein determining whether the server responds to the query signal includes waiting a specified period of time before determining the server has not responded to the query signal.

6. The method of claim 1 wherein determining the health status of a server further comprises:
    transmitting a query signal to the server to determine the server's health status; and
    receiving the server's response to the query signal; and
    determining the server's health status based upon the server's response.

7. The method of claim 1 wherein performing treatment includes terminating the server if the server is deemed failed.

8. The method of claim 1 further comprising controlling the functionality of the monitoring instance by an administration server.

9. The method of claim 8 further comprising communicating between the monitoring instance and administration server using encoding.

10. The method of claim 1 wherein determining the health status of the at least one server is implemented using java language programming.

11. The method of claim 10 wherein the java language programming includes a java method instance.

12. The method of claim 1 wherein performing treatment on the server is implemented using java language programming.

13. The method of claim 12 wherein the java language programming includes a java method instance.

14. The method of claim 1 wherein the java servlet includes an asynchronous servlet configured to return the health status to the monitoring instance upon the occurrence of an event.

15. The method of claim 1 wherein providing a triggering event includes:
    determining whether an interval period has elapsed, the interval period corresponding to a time between successive health checks performed on a server, wherein a value specified in a health check interval parameter corresponds to the interval period.

16. The method of claim 15 wherein the health check interval parameter may be accessed and set.

17. The method of claim 1 wherein providing a triggering event includes:
determining whether a timeout period has elapsed, the timeout period corresponding to a time the monitoring instance will wait for a response to a health check query performed by the monitoring instance to the server, wherein a value specified in a health check timeout parameter corresponds to the timeout period.

18. The method of claim 17 wherein the health check timeout parameter may be accessed and set.

19. The method of claim 15 wherein the health check interval parameter may be accessed and set.

20. The method of claim 1, further comprising:
continuing operations with the server in a degenerated health status, if it is determined not to restart the server.

21. The method of claim 1, further comprising:
restarting the server if it is determined to do so.

* * * * *

UNITED STATES PATENT AND TRADEMARK OFFICE
CERTIFICATE OF CORRECTION

PATENT NO. : 7,152,185 B2 Page 1 of 1
APPLICATION NO. : 10/338981
DATED : December 19, 2006
INVENTOR(S) : Srivastava et al.

It is certified that error appears in the above-identified patent and that said Letters Patent is hereby corrected as shown below:

In claim 4, col. 24, line 27: delete "serve's" and insert therefor -- server's --

Signed and Sealed this

Fifth Day of June, 2007

JON W. DUDAS
*Director of the United States Patent and Trademark Office*